(12) United States Patent
Choi et al.

(10) Patent No.: US 11,237,675 B2
(45) Date of Patent: Feb. 1, 2022

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Byung Jin Choi, Gyeonggi-do (KR); DongOk Kim, Busan (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 16/106,979

(22) Filed: Aug. 21, 2018

(65) Prior Publication Data

US 2019/0064964 A1    Feb. 28, 2019

(30) Foreign Application Priority Data

Aug. 22, 2017   (KR) .......................... 10-2017-0105952

(51) Int. Cl.
*G06F 3/044* (2006.01)

(52) U.S. Cl.
CPC .......... *G06F 3/0443* (2019.05); *G06F 3/0446* (2019.05); *G06F 2203/04102* (2013.01); *G06F 2203/04111* (2013.01)

(58) Field of Classification Search
CPC ........... G06F 3/044; G06F 2203/04102; G06F 2203/04111
See application file for complete search history.

(56) References Cited

U.S. PATENT DOCUMENTS

| 2004/0001998 | A1* | 1/2004 | Hopkins | B41J 3/407 429/124 |
| 2014/0198268 | A1* | 7/2014 | Sugita | G06F 3/0443 349/12 |
| 2017/0139525 | A1* | 5/2017 | Jo | H01L 51/5253 |
| 2017/0160830 | A1* | 6/2017 | Lee | G06F 3/044 |
| 2017/0344187 | A1* | 11/2017 | Ko | G06F 3/0418 |
| 2018/0059837 | A1* | 3/2018 | Kim | G06F 3/0443 |

FOREIGN PATENT DOCUMENTS

| CN | 106415453 A | 2/2017 | |
| CN | 109240530 A | 1/2019 | |
| KR | 10-2012-0018046 A | 2/2012 | |
| KR | 10-2014-0092366 A | 7/2014 | |
| KR | 101449499 B1 * | 10/2014 | G06F 3/044 |
| KR | 10-1687158 B1 | 12/2016 | |
| KR | 10-2017-0089467 A | 8/2017 | |

OTHER PUBLICATIONS

English Translation of WO 2016/208660 dated Dec. 29, 2016.*
English Translation of KR 10-1449499 (Year: 2014).*

* cited by examiner

*Primary Examiner* — Patrick N Edouard
*Assistant Examiner* — Eboni N Giles
(74) *Attorney, Agent, or Firm* — The PL Law Group, PLLC

(57) ABSTRACT

A touch sensor includes a substrate layer, a plurality of sensing electrodes on the substrate layer, and a dummy line between the sensing electrodes, the dummy line extending along a boundary of the sensing electrode. Electrode visibility is reduced by the dummy line, and touch sensitivity of the touch sensor is also improved.

9 Claims, 7 Drawing Sheets

TOUCH SENSOR AND IMAGE DISPLAY DEVICE INCLUDING THE SAME

CROSS-REFERENCE TO RELATED APPLICATION AND CLAIM OF PRIORITY

This application claims priority to Korean Patent Application No. 10-2017-0105952 filed on Aug. 22, 2017 in the Korean Intellectual Property Office (KIPO), the entire disclosure of which is incorporated by reference herein.

BACKGROUND

1. Field

The present invention relates to a touch sensor and an image display device including the same. More particularly, the present invention relates to a touch sensor including a patterned sensing electrode, and an image display device including the same.

2. Description of the Related Art

As information technologies are being developed, various demands in display devices having thinner dimension, lightweight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

As a resolution of the display device become increased to a QHD (Quad High Definition) level or a UHD (Ultra High Definition) level, a high resolution is also required in the touch sensor. Thus, a reduction of an optical interference from a sensing electrode included in the touch sensor is needed.

For example, if conductive patterns included in the sensing electrode are visible to the user, an image quality of the display device may be degraded. When structures included in a display panel of the display device overlap the conductive patterns of the sensing electrode, the image quality may be further degraded.

Thus, development of the touch sensor having improved transmittance and optical properties while also having high sensitivity is required. For example, Korean Patent Publication No. 2014-0092366 discloses an image display device combined with a touch screen panel including a touch sensor. However, demands of a touch sensor or a touch panel with high resolution and improved optical properties are still increasing.

SUMMARY

According to an aspect of the present invention, there is provided a touch sensor having improved sensitivity, resolution and optical properties.

According to an aspect of the present invention, there is provided an image display device including the touch sensor and having enhanced image quality.

The above aspects of the present inventive concepts will be achieved by the following features or constructions:

(1) A touch sensor, comprising: a substrate layer; a plurality of sensing electrodes on the substrate layer; and a dummy line between the sensing electrodes, the dummy line extending along a boundary of the sensing electrode.

(2) The touch sensor according to the above (1), wherein the boundary of the sensing electrode has a wavy shape or a saw-tooth shape, and the dummy line has a wave form the same as that of the boundary of the sensing electrode.

(3) The touch sensor according to the above (1), wherein the sensing electrodes are arranged along a first direction and a second direction which are parallel to a top surface of the substrate layer to cross each other, and the dummy line extends in a diagonal direction relative to the first direction or the second direction.

(4) The touch sensor according to the above (3), wherein the sensing electrode has a diamond shape, and the dummy line has a straight line shape.

(5) The touch sensor according to the above (3), wherein the sensing electrodes include first sensing electrodes arranged along the first direction, and second sensing electrodes arranged along the second direction, wherein the first sensing electrodes have an island pattern shape and the second sensing electrodes are connected to each other by connecting portions extending in the second direction.

(6) The touch sensor according to the above (5), further comprising bridge electrodes electrically connecting the first sensing electrodes neighboring each other.

(7) The touch sensor according to the above (6), wherein the dummy line extends in the diagonal direction to cross the connecting portion or the bridge electrode.

(8) The touch sensor according to the above (1), wherein dummy regions are defined between the boundaries of the sensing electrodes neighboring each other, and the dummy line is disposed in each of the dummy regions.

(9) The touch sensor according to the above (8), wherein the dummy line is divided into at least two lines in the dummy region.

(10) The touch sensor according to the above (1), wherein the sensing electrode includes electrode lines therein, and the dummy line extends in a diagonal direction relative to the electrode lines.

(11) The touch sensor according to the above (10), wherein the electrode lines extend in a linear shape, a wavy shape or a saw-tooth shape.

(12) The touch sensor according to the above (10), wherein the sensing electrodes further include connecting patterns therein which connect the electrode lines neighboring each other.

(13) The touch sensor according to the above (12), wherein the sensing electrodes include slits therein which are confined by the electrode lines and the connecting patterns neighboring each other.

(14) An image display device including the touch sensor according to any one of the above (1) to (13).

In the touch sensor according to exemplary embodiments as described above, a dummy line may be formed in a dummy region defined between neighboring sensing electrodes. The dummy line may have a shape substantially the same as that of a boundary of the sensing electrode. Thus, a regional pattern deviation may be reduced by the dummy line so that an electrode visibility may be also reduced.

A linearity and continuity of a mutual capacitance between a first sensing electrode and a second sensing electrode may be maintained by the dummy line so that a sensitivity of the touch sensor may be further enhanced.

In exemplary embodiments, the dummy line may be divided into a plurality of lines in the dummy region to have a width in which the dummy line may not be viewed by the user, and the sensitivity and signal speed may be increased.

In some embodiments, the sensing electrode may include a plurality of slits therein. A light scattering or a light diffraction may be induced by the slits so that a visibility of the sensing electrode may be reduced. Further, an aperture ratio of the touch sensor may be improved by the slits to achieve a high transmittance structure.

The touch sensor may be effectively applied to an image display device with high resolution to improve electrical, electrical and mechanical properties thereof.

DETAILED DESCRIPTION

According to exemplary embodiments of the present invention, there is provided a touch sensor which may comprise a plurality of sensing electrodes and dummy lines extending along a profile of a boundary of the sensing electrode. An image display device including the touch sensor is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
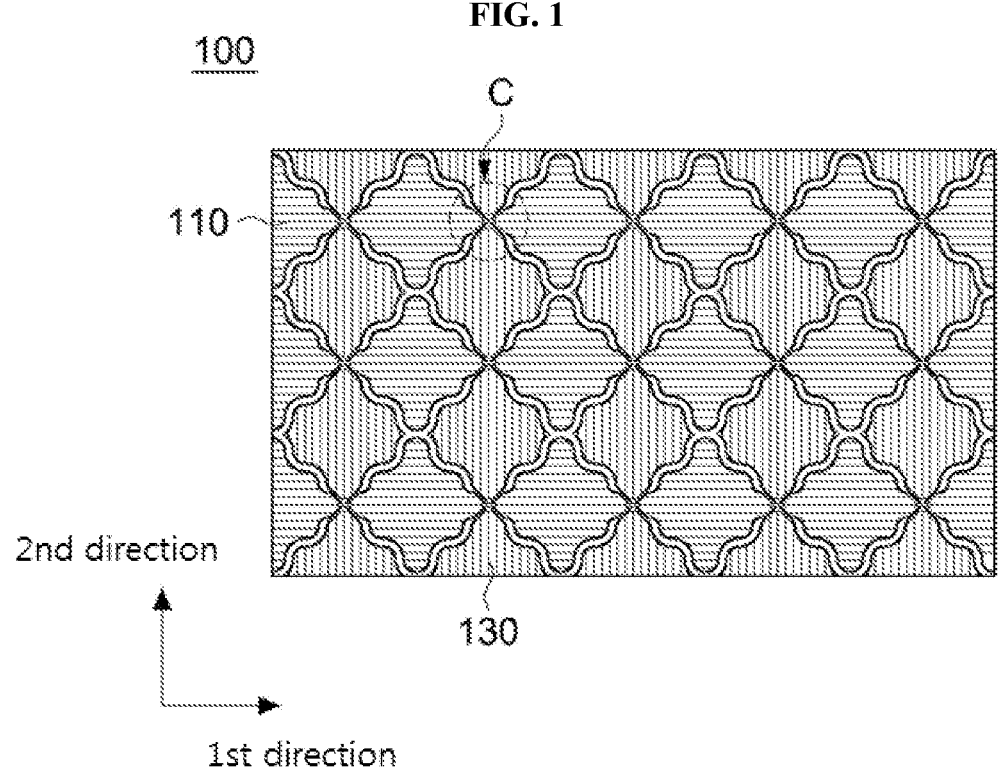
FIG. 1 is a schematic top plane view illustrating a touch sensor in accordance with exemplary embodiments.
Figure 2:
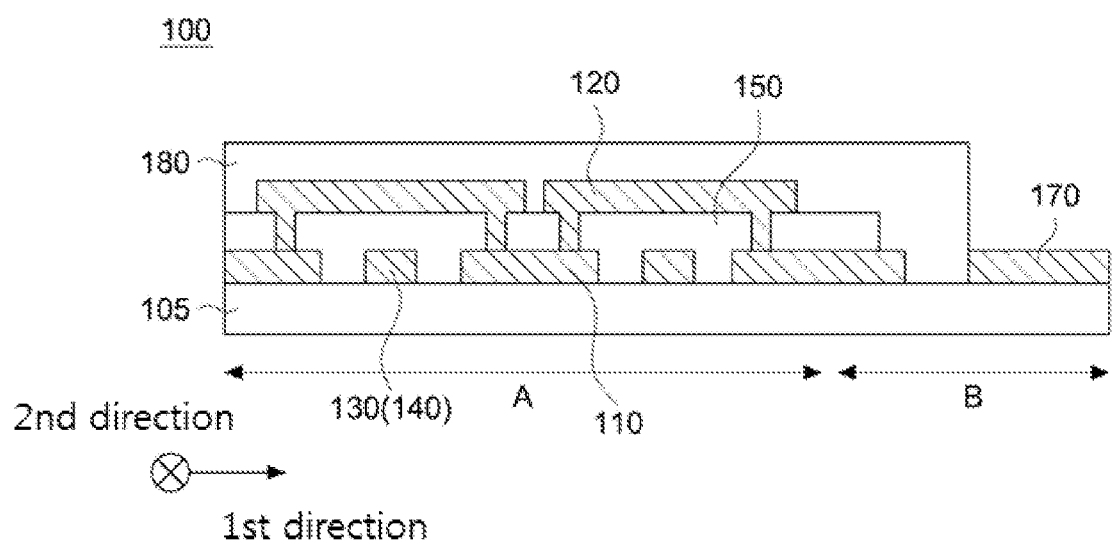
FIG. 2 is a cross-sectional view illustrating a touch sensor in accordance with exemplary embodiments.

FIG. 1 is a schematic top plane view illustrating a touch sensor in accordance with exemplary embodiments. FIG. 2 is a schematic cross-sectional view illustrating a touch sensor in accordance with exemplary embodiments For example, FIG. 2 includes a partial cross-sectional view of a region designated as "C" in FIG. 1.

Referring to FIGS. 1 and 2, a touch sensor 100 may include a substrate layer 105 and sensing electrodes 110 and 130 arranged on the substrate layer 105.

The substrate layer 105 may include a film-type substrate that may serve as a base layer for forming the sensing electrodes 110 and 130, or an object or a workpiece on which the sensing electrodes 110 and 130 are formed. In some embodiments, the substrate layer 105 may include a display panel on which the sensing electrodes 110 and 130 may be directly formed.

For example, the substrate layer 105 may include a substrate or a film material commonly used in the touch sensor, e.g., glass, polymer and/or an inorganic insulation material. The polymer may include, e.g., cyclo olefin polymer (COP), polyethylene terephthalate (PET), polyacrylate (PAR), polyether imide (PEI), polyethylene naphthalate (PEN), polyphenylene sulfide (PPS), polyallylate, polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc. The inorganic insulation material may include, e.g., silicon oxide, silicon nitride, silicon oxynitride, a metal oxide, etc.

The sensing electrodes 110 and 130 may include first sensing electrodes 110 and second sensing electrodes 130.

The first sensing electrodes 110 may be arranged along a first direction (e.g., an X-axis direction) that may be parallel to a top surface of the substrate layer 105. In some embodiments, the first sensing electrodes 110 may include island-type unit electrodes physically separated from each other. In this case, the first sensing electrodes 110 neighboring in the first direction may be electrically connected to each other by a bridge electrode 120.

Accordingly, a first sensing electrode row extending in the first direction may be formed by a plurality of the first sensing electrodes 110. Further, a plurality of the first sensing electrode rows may be arranged along a second direction that may be parallel to the top surface of the substrate layer 105. The first and second directions may cross each other, e.g., to be perpendicular to each other.

The second sensing electrodes 130 may be arranged along the second direction (e.g., a Y-axis direction). Accordingly, a second sensing electrode column extending in the second direction may be formed by the second sensing electrodes 130. Further, a plurality of the second sensing electrode columns may be arranged along the first direction.

In some embodiments, the second sensing electrodes 130 neighboring in the second direction may be physically and electrically connected by a connecting portion 140. For example, the connecting portion 140 may be integrally formed with the second sensing electrodes 130 at the same level.

The sensing electrodes 110 and 130, and/or the bridge electrode 120 may include a metal, an alloy, a metal wire or a transparent conductive oxide.

For example, the sensing electrodes 110 and 130, and/or the bridge electrode 120 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), or an alloy thereof (e.g., silver-palladium-copper (APC)). These may be used alone or in a combination thereof.

The sensing electrodes 110 and 130, and/or the bridge electrode 120 may include the transparent conductive oxide such as indium tin oxide (ITO), indium zinc oxide (IZO), zinc oxide (ZnO), indium zinc tin oxide (IZTO), cadmium tin oxide (CTO), etc.

In some embodiments, the sensing electrodes 110 and 130, and/or the bridge electrode 120 may include a stack structure including the transparent conductive oxide and the metal. For example, the sensing electrodes 110 and 130, and/or the bridge electrode 120 may have a triple-layered structure including a transparent conductive oxide layer-a metal layer-a transparent conductive oxide layer. In this case, a flexible property may be enhanced by the metal layer, and a resistance may be reduced to increase a signal transfer speed. Further, an anti-corrosion property and a transmittance may be improved by the transparent conductive oxide layer.

As illustrated in FIG. 2, an insulation layer 150 may be formed on the substrate layer 105 to at least partially cover the sensing electrodes 110 and 130. In exemplary embodiments, the insulation layer 150 may be formed at an intersection area of the first sensing electrode 110 and the second sensing electrode 130 to cover the connecting portion 140 of the second sensing electrode 130. The bridge electrode 120 may be formed on the insulation layer 150, and may be connected to the first sensing electrodes 110 neighboring each other.

The insulation layer 150 may include an inorganic insulation material such as silicon oxide, silicon nitride, etc., or an organic insulation material such as acryl-based resin, a siloxane-based resin, etc.

As illustrated in FIG. 2, the touch sensor 100 may include a sensing region A and a wiring region B. The sensing electrodes 110 and 130, and the bridge electrode 120 may be disposed on the substrate layer 105 of the sensing region A. A pad 170 may be disposed on the substrate layer 105 of the wiring region B.

In exemplary embodiments, a trace may extend from each of the first sensing electrode row and the second sensing electrode column to be electrically connected to the pad 170 in the wiring region B.

Accordingly, a physical touch information introduced to the touch sensor 100 may be converted into an electrical signal generated from a capacitance difference by the first sensing electrode 110 and the second sensing electrode 130. The electrical signal may be transferred to a driving IC through the pad 170 so that a touch sensing may be implemented. The driving IC may be coupled to the pad 170 via, e.g., a flexible printed circuit board (FPCB).

A passivation layer 180 may protect the sensing electrodes 110 and 130, and the bridge electrode 120 on the sensing region A, and may also extend to the wiring region B. The passivation layer 180 may include an opening through which the pad 170 may be exposed.

The passivation layer 180 may include an inorganic insulation material such as silicon oxide, silicon nitride, etc., or an organic insulation material such as acryl-based resin, a siloxane-based resin, etc.

As illustrated in FIG. 1, the first sensing electrode 110 and the second sensing electrode 130 may be patterned into a predetermined shape.

In exemplary embodiments, the first sensing electrode 110 and the second sensing electrode 130 may be patterned to have a boundary or periphery of a wavy shape. Accordingly, a moire phenomenon which may occur when the sensing electrodes 110 and 130, and electrodes or wirings (e.g., a data line, a gate line, etc.) in a display panel disposed under the touch sensor 100 overlap each other may be avoided or reduced.

FIGS. 3 to 6 are schematic top plane views illustrating a construction of a sensing electrode and a dummy line in accordance with exemplary embodiments.

Figure 3:
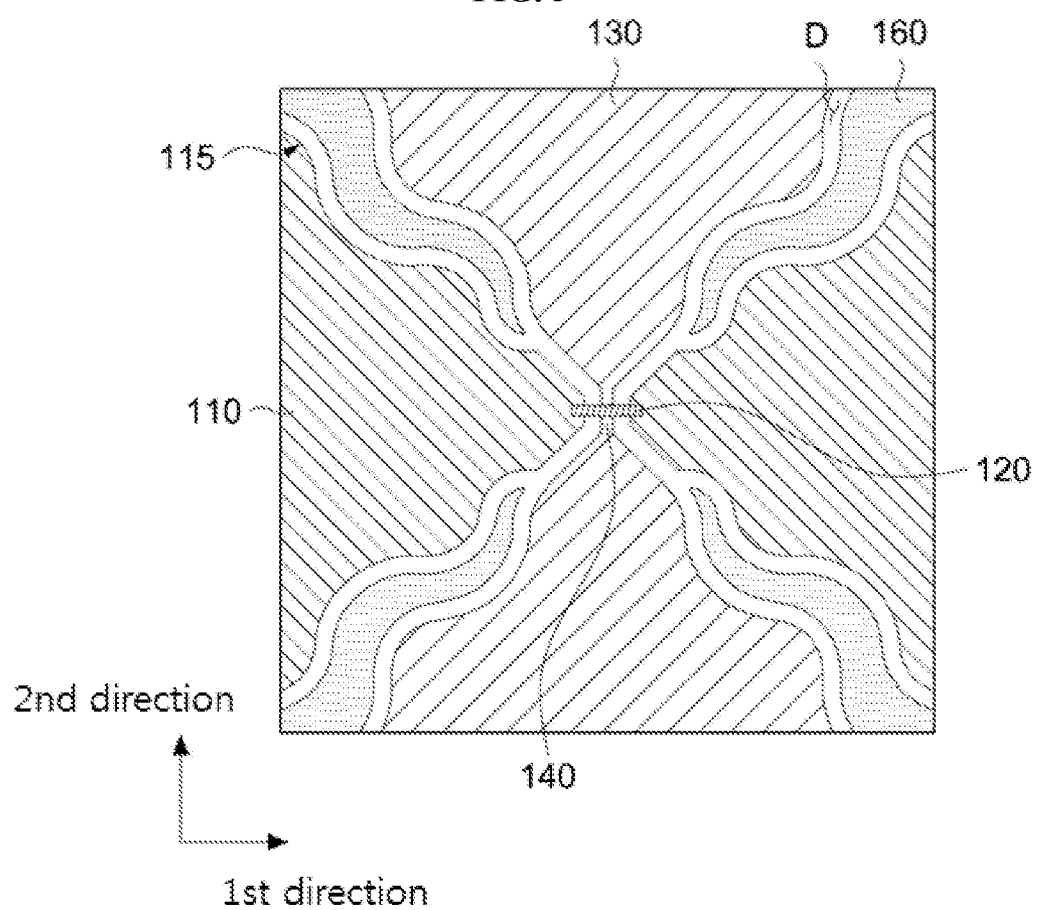
FIGS. 3 to 6 are schematic top plane views illustrating a construction of a sensing electrode and a dummy line in accordance with exemplary embodiments.

Referring to FIG. 3, as described above, boundaries 115 of the first sensing electrode 110 and the second sensing electrode 130 may have a wavy profile. A dummy region D may be defined between the boundaries 115 of the first sensing electrode 110 and the second sensing electrode 130.

A dummy line 160 may be disposed in the dummy region D. The dummy line 160 may be spaced apart from the sensing electrodes 110 and 130, and may extend along the profile of the boundaries 115 of the sensing electrodes 110 and 130.

In exemplary embodiments, the dummy line 160 may be disposed in each dummy region D, and may have a shape substantially the same as or similar to that of the boundaries 115 of the sensing electrodes 110 and 130. For example, the dummy line 160 may have a wave form substantially the same as that of the boundaries 115 of the sensing electrodes 110 and 130, and may extend in a single wave form. As illustrated in FIG. 3, the dummy line 160 may extend in a substantially wavy shape.

The dummy line 160 having the shape substantially the same as or similar to that of the boundaries 115 of the sensing electrodes 110 and 130 may be disposed in the dummy region D so that an electrode visibility due to an electrode arrangement deviation in the dummy region D may be reduced or prevented. Further, the dummy line 160 may have the wavy shape so that a moire phenomenon due to an overlap with structures of a display panel may be avoided.

Further, the dummy line 160 may be disposed in each dummy region D to prevent an excessive increase of a capacitance generated between the sensing electrodes 110 and 130 and improve an operational speed. A linearity and uniformity of the capacitance may be also enhanced by the dummy line 160 so that a reliability of a signal transfer may be improved.

In exemplary embodiments, the dummy line 160 may extend in a diagonal direction relative to the bridge electrode 120 and the connecting portion 140. For example, the dummy line 160 may extend in a diagonal direction by a predetermined angle relative to the first direction or the second direction. Thus, the dummy line 160 may be formed in a different direction from an arrangement direction of the sensing electrodes so that an irregularity of conductive patterns in the touch sensor may be increased to induce a light scattering and suppress an electrode visibility effectively.

Figure 4:
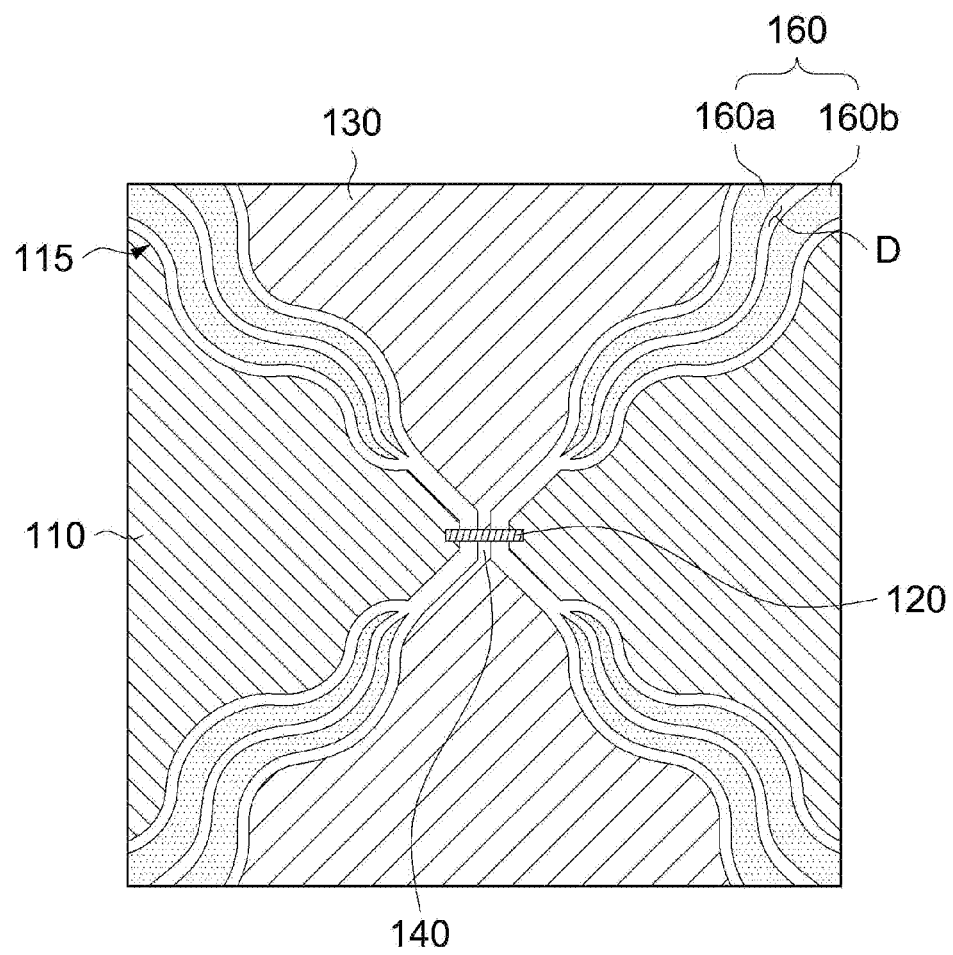

Referring to FIG. 4, a dummy line 160 may be divided into a plurality of dummy lines in the dummy region D. In exemplary embodiments, the dummy line 161 may be divided into a first dummy line 160a and a second dummy line 160b.

The dummy line 160 may be divided into a plurality of lines so that a transmittance of the touch sensor may be increased while reducing a visibility of the dummy line 160. Further, a width of an individual dummy line 160 may be decreased so that an RC delay caused by a capacitance disturb between the sensing electrodes 110 and 130 may be prevented.

The first dummy line 160a and the second dummy line 160b may have a wavy shape substantially the same as or similar to that of each boundary 115 of the sensing electrodes 110 and 130. For each of the first and second dummy lines 160a and 160b may have a width of about 100 μm or less, for example, about 50 μm or less.

Figure 5:
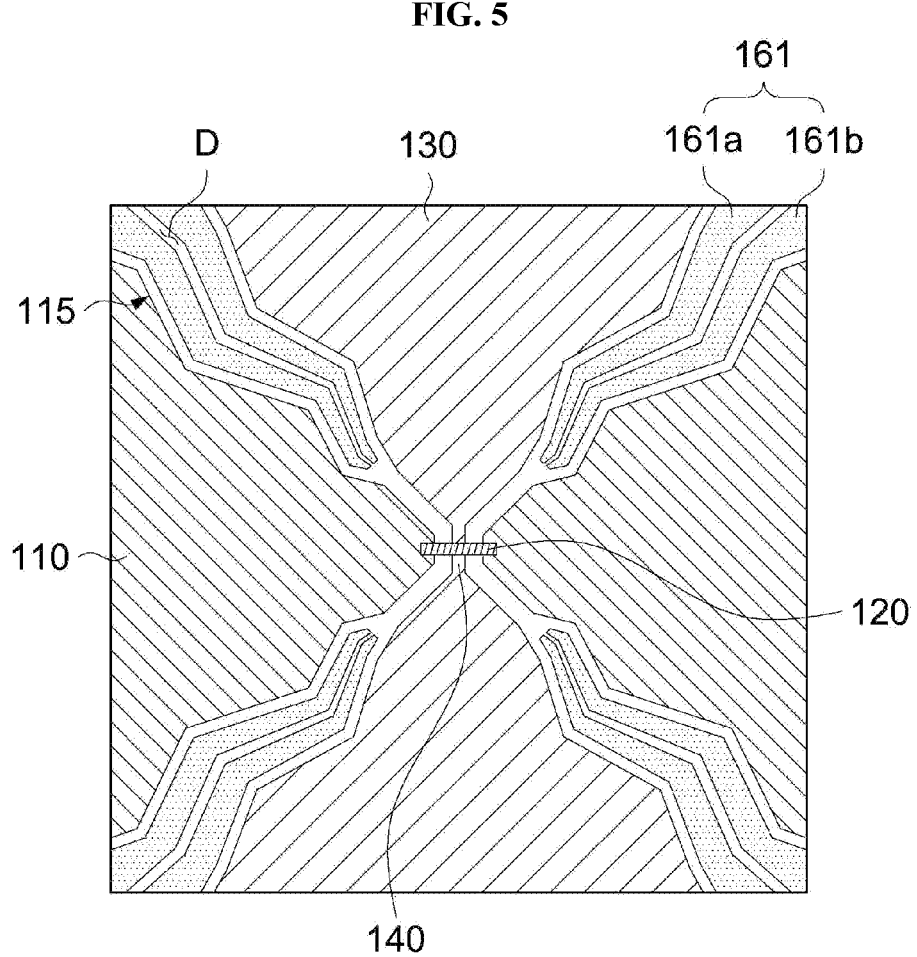

Referring to FIG. 5, in some embodiments, the boundary 115 of the sensing electrodes 110 and 130 may have a substantially saw-tooth shape.

In this case, a dummy line 161 may also extend along a profile of the boundary 115 to have substantially the saw-tooth shape. The dummy line 161 may include a boundary having a wave form substantially the same as that of the boundary 115 of the sensing electrodes 110 and 130, and may extend in a single wave form.

As described above, the dummy line 161 may be divided into a plurality of lines in each dummy region D, for example, may include a first dummy line 161a and a second dummy line 161b.

Figure 6:
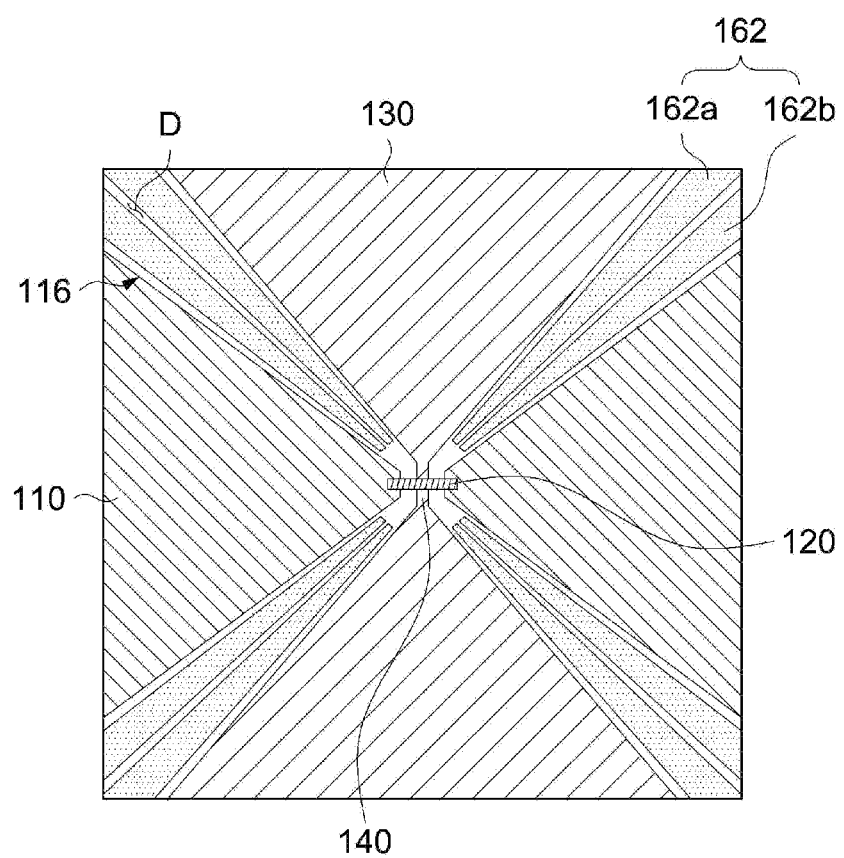

Referring to FIG. 6, the sensing electrodes 110 and 130 may each be patterned into a polygonal shape to have, e.g., a diamond pattern shape.

In this case, a boundary 116 of the sensing electrodes 110 and 130 may have a substantially straight line shape. In exemplary embodiments, the boundary 116 of the sensing electrodes 110 and 130 may have a linear shape extending in a diagonal direction with a predetermined angle relative to the first direction or the second direction.

A dummy line 162 may have a straight line shape substantially the same as or similar to that of the boundary 116, and may extend diagonally. As described above, the dummy line 162 may be divided into a plurality of lines in each dummy region D, and may include a first dummy line 162a and a second dummy line 162b.

Figure 7:
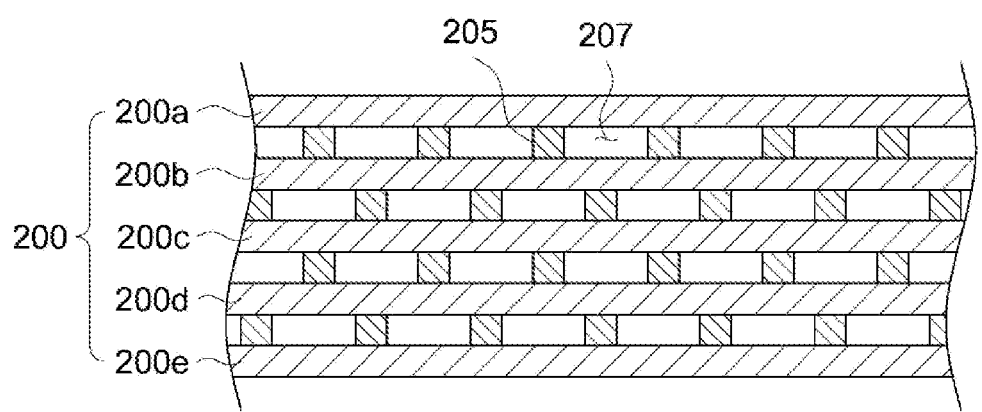
FIGS. 7 to 9 are schematic top plane views illustrating a pattern construction of a sensing electrode.
Figure 8:
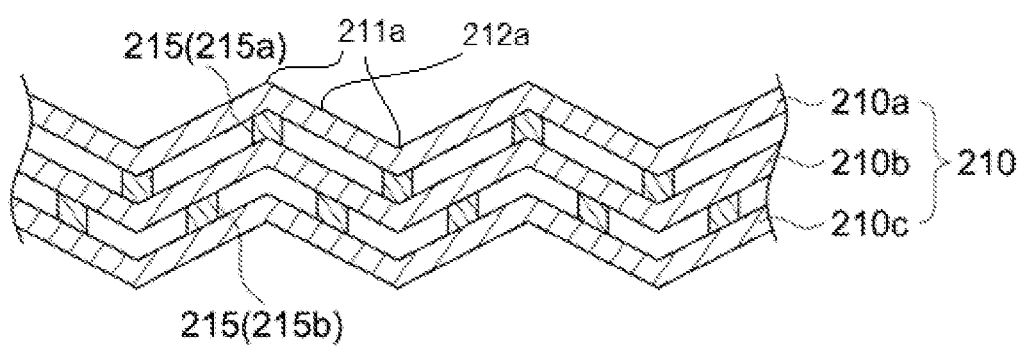
Figure 9:
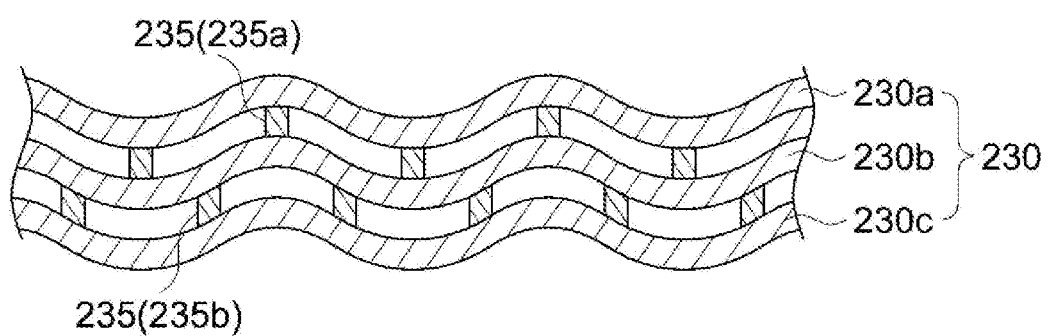

FIGS. 7 to 9 are schematic top plane views illustrating a pattern construction of a sensing electrode. For example, FIGS. 7 to 9 are partially enlarged views of an inside of each sensing electrode 110 and 130 illustrated in FIGS. 3 to 6.

Referring to FIG. 7, the sensing electrodes 110 and 130 may include electrode lines 200 and connecting patterns 205.

The electrode line 200 may extend in the first direction or the second direction, and a plurality of electrode lines (e.g., designated as 200a through 200e) may be parallel to each other.

The connecting patterns 205 may be arranged between the electrode lines 200 neighboring each other such that the electrode lines 200 may be physically and electrically connected to each other. Slits 207 may be defined in the sensing electrodes 110 and 130 by the electrode lines 200 and the connecting patterns 205 neighboring each other.

The sensing electrodes 100 and 130 may include the slits 207 arranged repeatedly so that a transmittance and an aperture ratio of the touch sensor may be improved. Further, a light scattering may be induced by the slits 207 so that electrodes may be prevented from being viewed by the user.

Further, if the dummy line is divided in the dummy region D as described above, a dummy slit may be formed between, e.g., first and second dummy lines. Thus, the light scattering and light transmittance may be improved throughout the sensing region and the dummy region so that the electrodes may be further prevented from being viewed by the user.

Referring to FIG. 8, an electrode line 210 may have a saw-tooth shape.

Connecting patterns 215 may be arranged between the electrode lines 210a, 210b and 210c neighboring each other so that the electrode lines 210 may be connected to each other and slits may be formed. Each electrode line has inflected portions and extension portions extended between the inflected portions. For example, the electrode line 210a has inflected portions 211a and extension portions 212a extended between neighboring inflected portions 211a.

In some embodiments, the connecting patterns 215 may be disposed at each bent portion or inflected portion of the electrode line 210. For example, the connecting patterns 215 may include first connecting patterns 215a and second connecting patterns 215b.

In exemplary embodiments, the first connecting pattern 215a may be connected to the inflected portion or the bent portion of the electrode line 210. The second connecting pattern 215b may be connected to extension portion of the electrode line 210 between the neighboring inflected portions.

Referring to FIG. 9, an electrode line 230 may have a wavy shape. Connecting patterns 235 may be arranged between the electrode lines 230a, 230b and 230c neighboring each other so that the electrode lines 230 may be connected to each other and slits may be formed.

In some embodiments, the connecting patterns 235 may be disposed at each inflected portion of the electrode line 230. For example, the connecting patterns 235 may include first connecting patterns 235a and second connecting patterns 235b.

In exemplary embodiments, the first connecting pattern 235a may be connected to the inflected portion, e.g., a convex portion or a concave portion of the electrode line 230. The second connecting pattern 235b may be connected to an extension portion of the electrode line 230 between the convex portion and the concave portion neighboring each other.

As described above, the connecting patterns 215 and 235 may be distributed throughout the inflected portions and the extension portions of the electrode lines 210 and 230, so that the electrode lines 210 and 230 may be more stably supported when a flexible display device may be folded or bent. The connecting patterns 215 and 235 may be more widely distributed so that a moire phenomenon may be further suppressed, and an electrode visibility due to an electrode shape deviation at the convex portion and the concave portion may be reduced.

According to exemplary embodiments, an image display device including the touch sensor is also provided.

For example, the touch sensor may be embedded between a window and a display panel of the image display device.

The display panel may include, e.g., a liquid crystal display (LCD) panel or an organic light emitting diode (OLED) panel. For example, the display panel may include a pixel circuit including a thin layer transistor (TFT) and a pixel portion connected to the pixel circuit. The pixel circuit may include electrodes and wirings such as a data line, a scan line, a driving line, etc., regularly arranged according to an arrangement of the pixel portion. The pixel portion may include a liquid crystal device or an OLED device, and may include a pixel electrode and an opposing electrode. The touch sensor may be disposed on the pixel portion.

According to exemplary embodiments as described above, the touch sensor may include the dummy lines. An electrode visibility and a moire phenomenon due to a regular overlap with the electrodes and the wirings included in the display panel may be effectively suppressed by the addition of the dummy lines.

What is claimed is:
1. A touch sensor, comprising:
   a substrate layer;
   a plurality of sensing electrodes on the substrate layer; and
   a dummy line between the sensing electrodes, the dummy line extending along a boundary of the sensing electrode, wherein the dummy line is a conductive pattern that is electrically and physically separated from the sensing electrodes,
   wherein the sensing electrodes include first sensing electrodes arranged along a first direction that is parallel to a top surface of the substrate layer, and second sensing electrodes arranged along a second direction that is parallel to the top surface of the substrate layer to cross the first direction;
   the first sensing electrodes have an island pattern shape, and the second sensing electrodes are connected to each other by connecting portions extending in the second direction;
   the sensing electrodes include electrode lines therein, the electrode lines each extending in a wavy shape or a saw-tooth shape therein, each electrode line comprising inflected portions and extension portions extended between neighboring inflected portions, wherein the extension portions have no inflection, and connecting patterns therein which connect the electrode lines neighboring each other;

the connecting patterns comprise first connecting patterns combined with the inflected portions of the electrode lines and second connecting patterns combined with the extension portions of the electrode lines;

the boundary of each of the first and second sensing electrodes has a wavy shape or a saw-tooth shape;

the dummy line has a wave form which is the same as that of the boundary of the sensing electrode;

the sensing electrodes and the dummy line are disposed at the same level; and the dummy line extends only between the sensing electrodes neighboring each other.

2. The touch sensor according to claim 1, wherein the dummy line extends in a diagonal direction relative to the first direction or the second direction.

3. The touch sensor according to claim 1, further comprising bridge electrodes electrically connecting the first sensing electrodes neighboring each other.

4. The touch sensor according to claim 3, wherein the dummy line extends in the diagonal direction to cross the connecting portion or the bridge electrode.

5. The touch sensor according to claim 1, wherein dummy regions are defined between the boundaries of the sensing electrodes neighboring each other, and the dummy line is disposed in each of the dummy regions.

6. The touch sensor according to claim 5, wherein the dummy line is divided into at least two lines in the dummy region.

7. The touch sensor according to claim 1, wherein the dummy line extends in a diagonal direction relative to the electrode lines.

8. The touch sensor according to claim 1, wherein the sensing electrodes include slits therein which are confined by the electrode lines and the connecting patterns neighboring each other.

9. An image display device including the touch sensor according to claim 1.

* * * * *